United States Patent [19]

Imanaka et al.

[11] Patent Number: 4,949,209

[45] Date of Patent: Aug. 14, 1990

[54] THIN-FILM MAGNETIC HEAD HAVING SPECIAL INPUT/OUTPUT TERMINAL BACKING CONNECTION AND METHOD OF FABRICATING THE SAME

[75] Inventors: Tadashi Imanaka, Odawara; Tetsuo Kobayashi, Ashigarakami; Harunobu Saito, Odawara; Osamu Hirai, Odawara; Kanji Kawakami, Mito, all of Japan

[73] Assignee: Hitachi, Ltd., Tokyo, Japan

[21] Appl. No.: 231,505

[22] Filed: Aug. 12, 1988

[30] Foreign Application Priority Data

Aug. 26, 1987 [JP] Japan ................ 62-210198

[51] Int. Cl.⁵ .................. G11B 5/147; G11B 5/17
[52] U.S. Cl. .................... 360/126; 360/123; 360/125
[58] Field of Search .......... 360/125, 126-127, 360/123

[56] References Cited

U.S. PATENT DOCUMENTS

| | | | |
|---|---|---|---|
| 4,550,353 | 10/1985 | Hirai et al. | 360/125 |
| 4,558,385 | 12/1985 | Kaminaka et al. | 360/126 |
| 4,716,484 | 12/1987 | Kaminaka et al. | 360/125 |
| 4,780,781 | 10/1988 | Sano et al. | 360/126 |
| 4,841,402 | 6/1989 | Imanaka et al. | 360/125 X |

FOREIGN PATENT DOCUMENTS 59-104717 6/1984 Japan .

*Primary Examiner*—John H. Wolff
*Attorney, Agent, or Firm*—Kenyon & Kenyon

[57] ABSTRACT

In a thin-film magnetic head having a magnetic core (upper magnetic layer), in the electromagnetic conversion section, which are composed of an upper first magnetic film, inorganic insulating film, and an upper second magnetic film, the upper first magnetic film is used as a second wiring for electrical continuity between the coil and input/output terminal. The upper first magnetic film is connected to the center of a coil which is of a single-layer structure. The first upper magnetic film is made of a same material as the coil and is formed simultaneously with the latter. In the region in which an input/output terminal backing is formed, the upper first magnetic film of a second wiring is removed. Thus, the electrical continuity is established between the input/output terminal and the center of the coil.

Also, the utilization of the upper first magnetic film as second wiring is applicable to a thin-film magnetic head having a coil of a multi-layer structure.

26 Claims, 8 Drawing Sheets

THIN-FILM MAGNETIC HEAD HAVING SPECIAL INPUT/OUTPUT TERMINAL BACKING CONNECTION AND METHOD OF FABRICATING THE SAME

BACKGROUND OF THE INVENTION

1. Field of the Invention

The present invention relates to a thin-film magnetic head and a method of manufacturing it, and more particularly to a thin-film magnetic head having a magnetic core of a two-film structure of which an upper and lower magnetic layers consist of two layers, respectively, and a method of fabricating it.

2. Description of the Related Art

These days, thin-film magnetic heads having a magnetic core of a two-film structure of which an upper and lower magnetic layers consist of two layers, respectively, have been proposed. In such thin-film magnetic heads, the upper and lower magnetic layers at the magnetic gap region facing a recording medium are thin comprising a single layer, respectively, while the upper and lower magnetic layers at a distance from the magnetic gap region are thick comprising two layers, respectively. Such structure improves the magnetic flux density at the magnetic gap region, prevents magnetization saturation for recording data onto the recording medium, enhances the resolution of the magnetic head for reproduction and also the efficiency of electromagnetic conversion.

FIG. 1 is a sectional view showing one example of the thin-film magnetic head of said two-film structure, the magnetic head being shown as split into two sections for electromagnetic conversion and wiring, respectively, indicated with H1 and H2, respectively. The wiring section H2 provides a connection between input/output terminal 15a and the center D of coil 8. The electromagnetic conversion section H1 shown in FIG. 1 is composed of a substrate 1 having formed thereon an underfilm 2 on which a lower first magnetic film 4 and a lower second magnetic film 5, forming together a lower magnetic layer 3, are formed. Further, a magnetic gap film 6 is formed on the lower second magnetic film 5. This magnetic gap film 6 is partially open at a region B away from the head portion A facing the magnetic recording medium to provide a connection between a portion of the lower magnetic layer 3 and a portion of an upper magnetic layer 10. Furthermore, there is formed on the magnetic gap film 6 an insulating layer 7 in which a coil 8 is formed. Besides, there is formed on the insulating layer 7 an upper first magnetic film 11 and an upper second magnetic film 13 which form together the upper magnetic layer 10.

At the electromagnetic conversion section H1 shown in FIG. 1, the upper first magnetic film 11 and the lower second magnetic film 5 are in contact with each other through the open region B in the magnetic gap film 6, so that the upper magnetic layer 10 and lower magnetic layer 3 are magnetically coupled to each other. The upper magnetic layer 10 is cut off at the region C as shown, so that the upper magnetic layer 10 and lower magnetic layer 3 form together a magnetic core.

As shown at the wiring section H2 in FIG. 1, a first wiring 8a is formed on the magnetic gap film 6a. This magnetic gap film 6a is made of a same material as the magnetic gap film 6 at the electromagnetic conversion section H1 and formed simultaneously with the magnetic gap film 6. The first wiring 8a is made of a same material as the coil 8 and formed simultaneously with the latter. There is formed, as a laminate on the first wiring 8a, an upper first magnetic film 11a and an upper second magnetic film 13a, which are made of the same materials as the upper first magnetic films 11 and upper second magnetic films 13 at the electromagnetic conversion section respectively and are formed simultaneously.

As shown at the electromagnetic conversion section H1 in FIG. 1, the upper first magnetic film 11a is connected to the center D of the coil 8, and the upper first magnetic film 11a and upper second magnetic film 13a form together a second wiring.

As shown at the wiring section H2 in FIG. 1, there is formed as laminated directly on the upper second magnetic film 13a an input/output terminal backing 14a on which an input/output terminal 15a is formed.

In the above-mentioned arrangement, the input/output terminal 15a and the center D of the coil 8 are connected to each other by means of the first wiring 8a, upper first magnetic film 11a and upper second magnetic film 13a (second wiring).

FIG. 2 is a schematic diagram showing the connection between the coil 8 and the input/output terminals 15a and 15b of the thin-film magnetic head shown in FIG. 1. As seen in FIG. 2, the input/output terminal 15a is intended to provide a connection with the center D of the coil 8. The input/output terminal 15b is intended for providing a connection with an outer circumference of the coil 8. As seen from FIGS. 1 and 2, the input/output terminal 15a and the center D of the coil 8 are connected to each other by means of the first wiring 8a and the second wiring formed by the upper first magnetic film 11a and upper second magnetic film 13a. Also, the outer circumference of the coil 8 and the input/output terminal 15b are connected to each other by means of the first wiring 8b and the second wiring formed by the upper first magnetic film 11b and upper second magnetic film 13b.

It should be noted that the above-mentioned first wiring 8b, upper first magnetic film 11b and upper second magnetic film 13b are not shown in FIG. 1. However, the first wiring 8b is made of a same material as the first wiring 8a shown in FIG. 1 and formed simultaneously with the latter. Also the upper first and second magnetic films 11b and 13b are made of same materials as the upper first and second magnetic films 11a and 13a, respectively, shown in FIG. 1 and formed simultaneously with the latter. In FIG. 2, the reference numeral 14b indicates an input/output terminal backing for the input/output terminal 15b.

Also, an invention of an improvement of the thin-film magnetic head shown in FIG. 1 is disclosed in the Japanese Unexamined Patent Publication (Kokai) No. 59-194717 and U.S. Pat. No. 4,550,353. FIG. 3 is a schematic diagram showing that improved thin-film magnetic magnetic head. As shown at the electromagnetic conversion section H1' in FIG. 3, a substrate 1' has formed thereon an under-film 2' on which are formed lower first and second magnetic films 4' and 5' forming together a lower magnetic layer 3'. Further, a magnetic gap film 6' is formed on the lower second magnetic film 5'. The magnetic gap film 6' is partially opened at the region B' away from the region A' facing the magnetic recording medium to provide a connection between a portion of the lower magnetic layer 3' and a portion of the upper magnetic layer 10'. Furthermore, the magnetic gap film 6' has formed thereon an insulating layer 7' in which a coil 8' is provided. In addition, the insulating layer 7' has formed thereon as laminated an upper first magnetic film 11', inorganic insulating film 12' and an upper second magnetic film 13', which form together an upper magnetic layer 10'.

As shown at the electromagnetic conversion section H1' in FIG. 3, the first upper magnetic film 11' and lower second magnetic film 5' are in contact with each other through the open region B' in the magnetic gap film 6' so that the upper magnetic layer 10' and lower magnetic layer 3' are magnetically coupled to each other. Further, the upper magnetic layer 10' is cut off at the region C' as shown, so that the upper magnetic layer 10' and lower magnetic layer 3' form together a magnetic core.

As shown at the wiring section H2' in FIG. 3, the magnetic gap film 6a' has formed thereon a first wiring 8a'. The magnetic gap film 6a' is made of a same material as the magnetic gap film 6' and formed simultaneously with the latter. The first wiring 8a' has formed as laminated thereon an upper first magnetic film 11a', inorganic insulating film 12a' and an upper second magnetic film 13a'. The upper first magnetic film 11a' is made of a same material as the upper first magnetic film 11 shown at the electromagnetic conversion section H1' and formed simultaneously with the latter. Also the inorganic insulating film 12' is made of a same material as the inorganic insulating film 12' shown at the wiring section H2' and formed simultaneously with the latter.

The thin-film magnetic head shown in FIG. 3 differs from that shown in FIG. 1 in that there are provided the inorganic insulating film 12' between the upper first magnetic film 11' and upper second magnetic film 13' and the inorganic insulating film 12a' between the upper first magnetic film 11a' and upper second magnetic film 13a'. The inorganic insulating films 12' and 12a' of which the etching speeds are low are provided for the following reasons. Namely, the existence of the inorganic insulating film 12' permits to prevent any over-etching of the upper first magnetic film 13' at the region A' facing the magnetic recording medium applied on the thin-film magnetic head. As a result, the upper first magnetic film 13, at the region A' facing the magnetic recording medium applied to the thin-film magnetic head is so formed as to have a predetermined thickness. Further, a thin-film magnetic head is formed having the upper magnetic layer 10' which is thick at the position away from the region A' facing the magnetic recording medium.

On the other hand, the provision of the inorganic insulating film 12a' between the upper first and second magnetic films 11a' and 13a' will cause the following problems: that is, as shown at the electromagnetic conversion section H1' in FIG. 3, the upper first magnetic film 11a' is connected to the center D' of the coil 8'. Therefore, the upper first magnetic film 11a' forms a second wiring. In the conventional method of fabricating thin-film magnetic head, however, the input/output terminal backing 14a' is laminated directly on the upper second magnetic film 13a' and the input/output terminal 15a' is formed on the input/output terminal backing 14a' as shown at the wiring section H2' in FIG. 3. As a result, the input/output terminal 15a' (input/output terminal backing 14a') and the center D' of the coil 8' cannot have an electrical continuity between them due to the existence of the inorganic insulating film 12a' regardless of the existence of the upper first magnetic film 11a' (second wiring).

The above-mentioned problem of the connection between the coil 8' and input/output terminal 15a' will occur similarly in the connection between the outer circumference of the coil 8' and input/output terminal (corresponding to the input/output terminal 15b in FIG. 2).

SUMMARY OF THE INVENTION

The present invention has an object to provide a thin-film magnetic head having an upper magnetic layer composed of an upper first magnetic film, inorganic insulating film and an upper second magnetic film, the upper first magnetic film being utilizable as a wiring to the coil, and a method of fabricating the same.

According to the present invention, the thin-film magnetic head has a wiring section in which there is formed on a first wiring made of a same material as the coil and formed simultaneously with the latter the upper first magnetic film (second wiring). The upper first magnetic film thus formed is removed in a region where an input/output terminal backing is formed, and the input/output terminal backing is laminated directly on the first wiring. Since the upper first magnetic film is connected to the center of the coil, there can be established an electrical continuity between the input/output terminal and the coil.

Also, the outer circumference of the coil is connected to the first wiring. Hence, the upper first magnetic film (second wiring) is formed on the first wiring, the upper first magnetic film is removed in the region where the input/output terminal backing is formed, and the input/output terminal backing is formed in the region where the upper first magnetic film is removed.

The relation in electrical continuity among the first, second wirings and the input/output terminal backing is applicable to a thin-film magnetic head having a doubly-formed coil.

These and other objects and advantages of the present invention will be better understood from the ensuing description made, by way of example, of the preferred embodiments with reference to the drawings.

DETAILED DESCRIPTION OF THE PRESENT INVENTION

Figure 1:
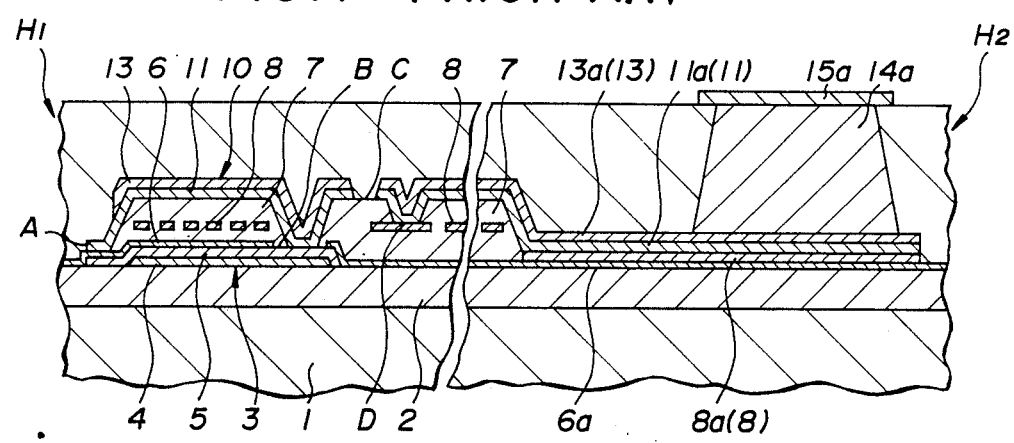
FIG. 1 is a sectional view of a conventional thin-film magnetic head having a magnetic core of two-film structure.
Figure 2:
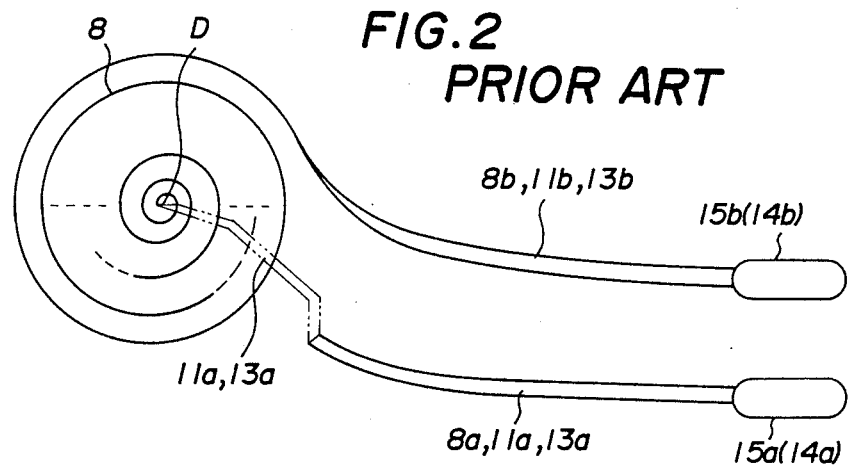
FIG. 2 is a schematic diagram showing the construction of the coil and wirings in the thin-film magnetic head shown in FIG. 1.
Figure 3:
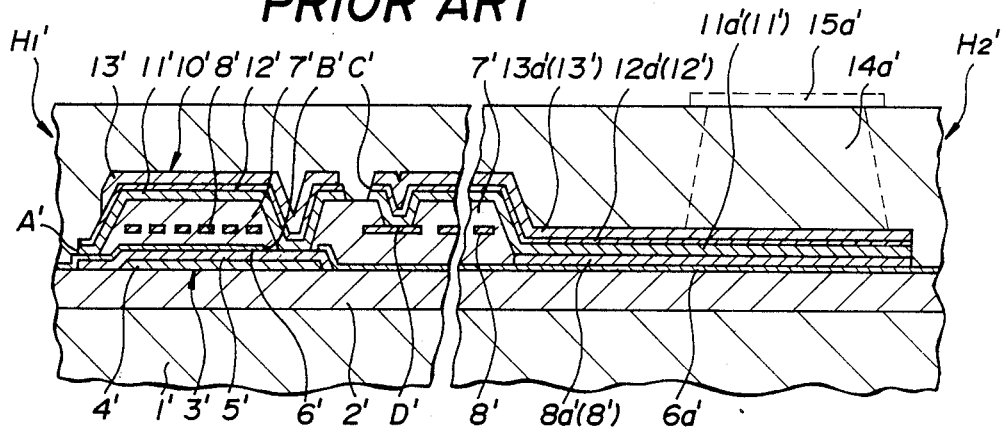
FIG. 3 is a sectional view of a conventional thin-film magnetic head having a magnetic core of a structure in which an inorganic insulating film is provided between the two magnetic films which together form the upper magnetic core.
Figure 4:
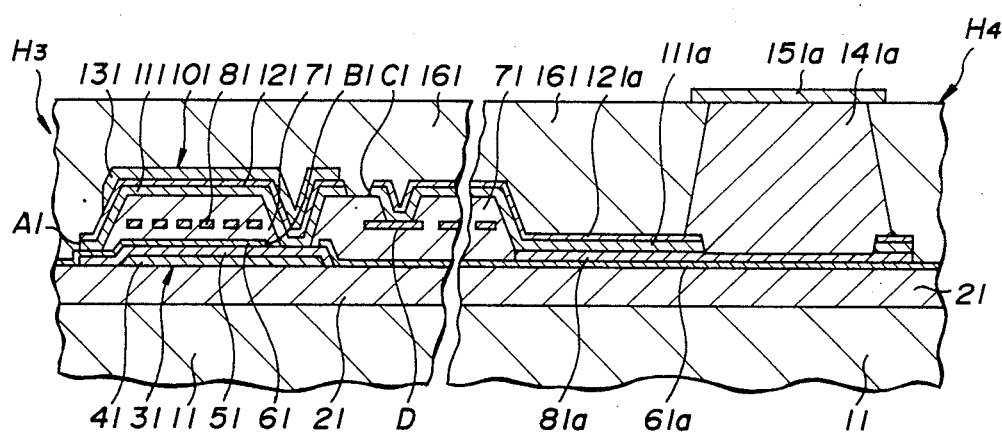
FIG. 4 is a sectional view showing one embodiment of a thin-film magnetic head according to the present invention.

FIG. 4 is a sectional view showing the first embodiment of the thin-film magnetic head according to the present invention. The head is illustrated as split in two sections: electromagnetic conversion section H3 and wiring section H4. The wiring section H4 provides a connection between an input/output terminal 151 a and coil 81. As shown at the electromagnetic conversion section H3 in FIG. 4, a substrate 11 has formed thereon an under-film 21 on which a lower first magnetic film 41 and lower second magnetic film 51 forming together a lower magnetic layer 31 are formed. Further, the lower second magnetic film 51 has formed thereon a magnetic gap film 61 which is partially opened at a region B1 away from a region A1 facing a magnetic recording medium to provide a connection between a portion of the lower magnetic layer 31 and a portion of an upper magnetic layer 101. The magnetic gap film 61 has formed thereon an insulating layer 71 in which a coil 81 is formed and on which is disposed on upper magnetic layer 101 formed by an upper first magnetic film 111, inorganic insulating film 121 and upper second magnetic film 131.

Further, as shown at the electromagnetic conversion section H3 in FIG. 4, the upper first magnetic film 111 and lower magnetic layer 31 (lower second magnetic film 51) are in contact with each other through the open region B1 in the magnetic gap film 61. The upper magnetic layer 101 is cut off at a region C1 as shown, so that the upper magnetic layer 101 and lower magnetic layer 31 form together a magnetic core.

Also, as shown at the wiring section H4 in FIG. 4, the magnetic gap film 61a has formed thereon a first wiring 81a. The magnetic gap film 61a is made of a same material as the magnetic gap film 61 and formed simultaneously with the latter. Also, the first wiring 81a is made of a same material as the coil 81 and formed simultaneously with the latter. The first wiring 81a has formed as a laminated thereon an upper first magnetic film 111a and inorganic insulating film 121a. The upper first magnetic film 111a is made of a same material as the upper first magnetic film 111 shown at the electromagnetic conversion section H3 in FIG. 4, and formed simultaneously with the latter. Also the inorganic insulating film 121a is made of a same material as the inorganic insulating film 121 shown at the electromagnetic conversion section H3 in FIG. 4, and formed simultaneously with the latter.

As shown at the electromagnetic conversion section H3 in FIG. 4, the upper first magnetic film 111a is connected to the center D1 of the coil 81, and forms a second wiring.

As shown at the wiring section H4 in FIG. 4, the input/output terminal backing 141a is laminated directly on the first wiring 81a, and has formed thereon an input/output terminal 151a. By the arrangement having been described in the above, the input/output terminal 151a and coil 81 are electrically connected to each other by means of the upper first magnetic film 111a.

It is not shown in FIG. 4, but the outer circumference of the coil 81 is connected to the input/output terminal by means of the first wiring 81a and upper first magnetic film (second wiring) similarly to the input/output terminal 151a shown in FIG. 4.

Figure 5:
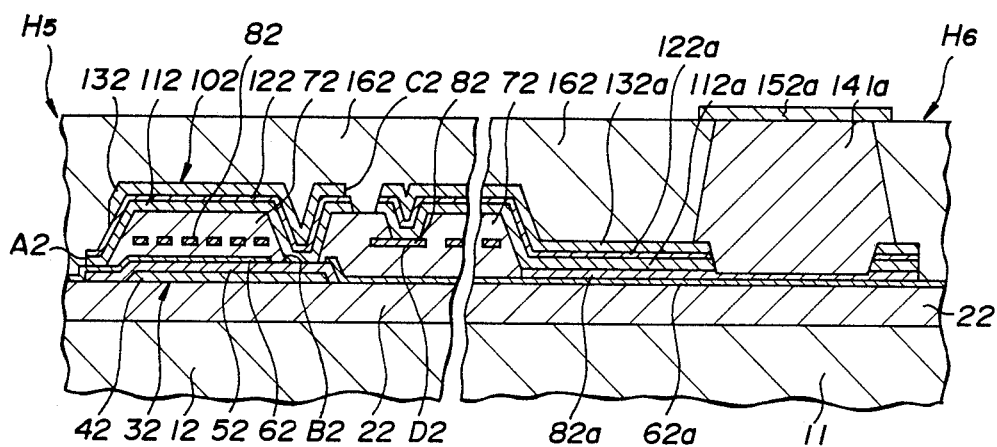
FIG. 5 is a sectional view showing a second embodiment of a the thin-film magnetic head according to the present invention.
Figure 6A:
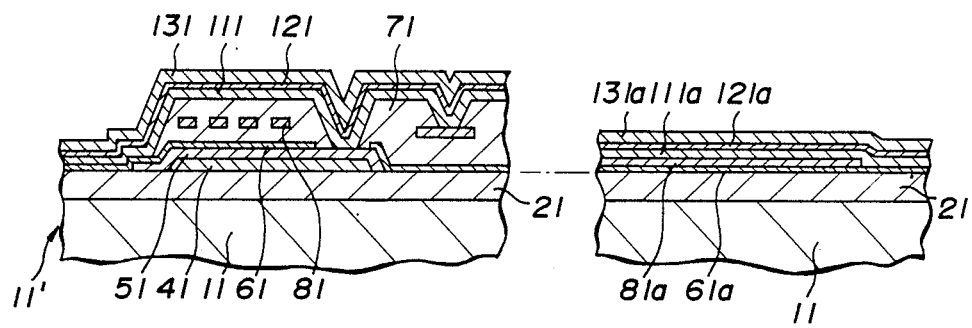
FIGS. 6 (a), (b), (c), (d) and (e) are sectional views, respectively, showing a first method of fabricating the thin-film magnetic head shown in FIG. 4.
Figure 6B:
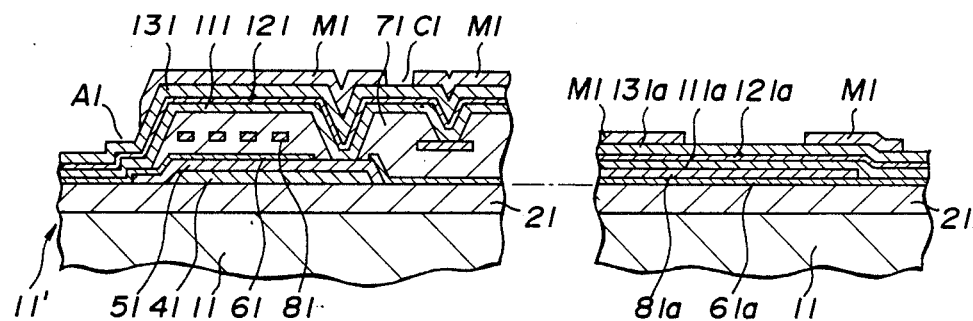
Figure 6C:
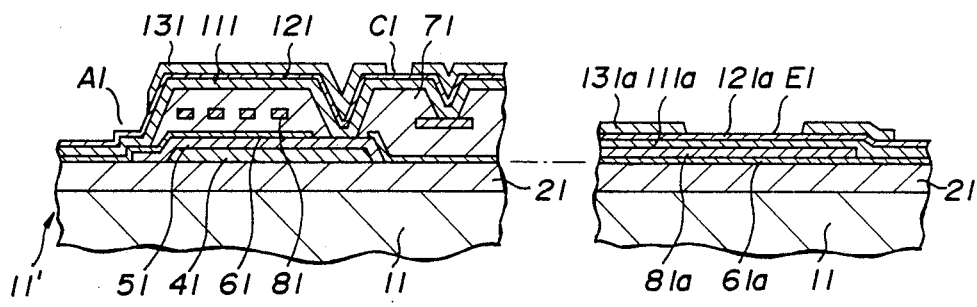
Figure 6D:
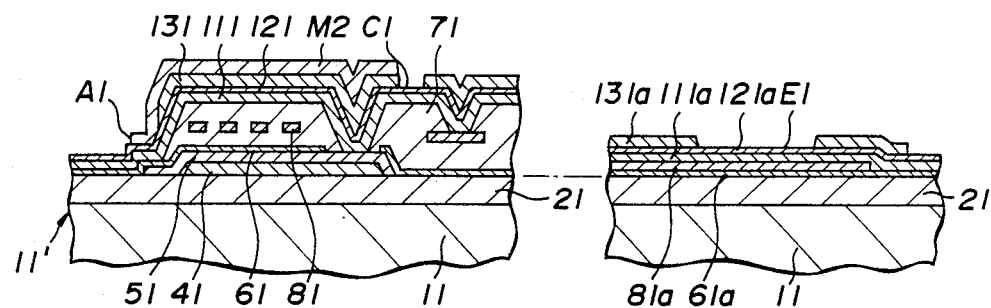
Figure 6E:
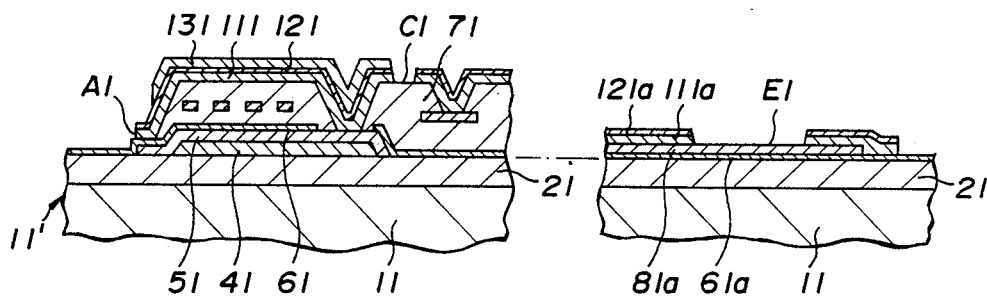

FIG. 5 is a sectional view showing a second embodiment of the thin-film magnetic head according to the present invention. The head is illustrated as split in two sections: electromagnetic conversion section H5 and wiring section H6. The wiring section H6 provides a connection between an input/output terminal 152a and coil 82. As shown at the electromagnetic conversion section H5 in FIG. 5, a substrate 12 has formed thereon an under-film 22 on which a lower first magnetic film 42 and lower second magnetic film 52 forming together a lower magnetic layer 32 are formed. Further, the lower second magnetic film 52 has formed thereon a magnetic gap film 62 which is partially opened at a region B2 away from a region A2 facing a magnetic recording medium to provide a connection between a portion of the lower magnetic layer 33 and a portion of an upper magnetic layer 102. The magnetic gap film 62 has formed thereon an insulating layer 72 in which a coil 82 is formed and on which is disposed on upper magnetic layer 102 formed by an upper first magnetic film 112, inorganic insulating film 122 and upper second magnetic film 132.

Further, as shown at the electromagnetic conversion section H5 in FIG. 5, the upper first magnetic film 112 and lower magnetic layer 32 (lower second magnetic film 52) are in contact with each other through the open region B2 in the magnetic gap film 62. The upper magnetic layer 102 is cut off at a region C2 as shown, so that the upper magnetic layer 102 and lower magnetic layer 32 form together a magnetic core.

Also, as shown at the wiring section H6 in FIG. 5, the magnetic gap film 62a has formed thereon a first wiring 82a. The magnetic gap film 62a is made of a same material as the magnetic gap film 62 and formed simultaneously with the latter. Also, the first wiring 82a is made of a same material as the coil 82 and formed simultaneously with the latter. The first wiring 82a has laminated thereon an upper first magnetic film 112a and inorganic insulating film 122a. The upper first magnetic film 112a is made of a same material as the upper first magnetic film 112 shown at the electromagnetic conversion section H5 in FIG. 5, and formed simultaneously with the latter. Also the inorganic insulating film 122a is made of a same material as the inorganic insulating film 122 shown at the electromagnetic conversion section H5 in FIG. 5, and formed simultaneously with the latter.

As shown at the electromagnetic conversion section H5 in FIG. 5, the upper first magnetic film 112 a is connected to the center D2 of the coil 82, and forms a second wiring.

As shown at the wiring section H6 in FIG. 5, the input/output terminal backing 142a is laminated directly on the first wiring 82a, and has formed thereon an input/output terminal 152a. By the arrangement having been described in the above, the input/output terminal 152a and coil 82 are electrically connected to each other by means of the upper first magnetic film 112a.

It is not shown in FIG. 5, but the outer circumference of the coil 82 is connected to the input/output terminal by means of the first wiring 82a and upper first magnetic film (second wiring) similarly to the input/output terminal 152a shown in FIG. 5.

A method of fabricating the thin-film magnetic head according to the first embodiment of the present invention will be described with reference to FIGS. 6 (a) thru (e). It should be noted that in FIG. 6, the substrate 11, under-film 21, lower first magnetic film 41, upper second magnetic film 51, magnetic gap film 61, coil 81 and insulating layer 61 are assumed to have already been formed through the well-known processes (not shown) up to the step in FIG. 6 (a). They will be generally called an intermediate 11' for the simplicity of illustration. As shown in FIG. 6 (a), an upper first magnetic film 111 (111a), inorganic insulating film 121 (121a) and upper second magnetic film 131 (131a) are laminated in this order on the nearly entire intermediate 11'. The upper first and second magnetic films 111 (111a) and 131 (131a) are made of a same material such as permalloy film or the like and laminated to nearly the same thickness. The inorganic insulating film 121 (121a) is formed from a material such as alumina or the like. The upper first magnetic film 111 (111a), inorganic insulating film 121 (121a) and upper second magnetic film 131 (131a) may be laminated in separate vacuum vessels, respectively, or sequentially in a same vacuum vessel. However, the sequential lamination of more than 2 kinds of the above-mentioned magnetic films in a same vacuum vessel is preferable since it can be done with a small number of times of putting the intermediate 11' into and removing from the vacuum and a small number of times of heating and cooling the intermediate 11', as compared with the lamination of the films in separate vacuum vessels.

Next, a mask M1 is formed on the upper second magnetic film 131 (131a) as shown in FIG. 6 (b).

As shown in FIG. 6 (c), the region A1 of the upper second magnetic film 131 which faces the recording medium, region C1 and the region E1 of the input/output terminal backing 141a (regions other than where the mask M1 is provided) are removed and patterned by etching. That is, in the region E1, the upper second magnetic film 131a is completely removed and the inorganic insulating film 121a is partially removed, too. However, since the inorganic insulating film 121 exists in the region A1 facing the recording medium, the upper first magnetic film 111 is not removed by etching. Therefore, at the region A1 facing the recording medium, the thickness of the upper first magnetic film can be maintained at a predetermined value. Note that the etching should preferably be a dry etching.

Next, a mask M2 is formed on the region A1 facing the recording medium and the magnetic core region on the upper second magnetic film 131 (region to the left of the region C1 shown) as in FIG. 6 (d).

As the result, the upper second magnetic film 131a is removed at the right of the region C1, and the inorganic insulating film 121a and upper first magnetic film 111a are partially removed in the region E1 where the input/output terminal backing 141a is formed, as shown in FIG. 6 (e). It should be noted that in the region E1 where the input/output terminal backing 141a is formed, the etching is done down to the upper first magnetic film 111 but this film is not completely removed. Also, the etching should preferably be a dry etching.

Therefore, the magnetic core portion of the upper magnetic layer 101 has a two-film structure consisting of the upper first and second magnetic films 111 and 131, the coil 81 is electrically connected to the upper first magnetic film 111a and first wiring 81a, and the region E1 in which the input/output terminal backing 141a is formed has the first wiring 61a exposed, as shown in FIG. 4.

Next, the above-mentioned input/output terminal backing 141a is formed in the region E1 by Cu plating or the like, and a protective film 161 made of alumina or the like is formed, and an input/output terminal 151a made of Au or the like is formed on the input/output terminal backing 141a. Through the above-mentioned processes, the thin-film magnetic head is formed as shown in FIG. 4.

As apparent from the foregoing description, the method of fabricating the thin-film magnetic head shown in FIGS. 6 (a) thru (e) permits the compete removal of the upper first magnetic film 111a in the region E1 where the input/output terminal backing 141a is formed. Consequently, in the above-mentioned region E1, the upper first and second magnetic films 111a and 131a do not exist. However, the first wiring 8a formed simultaneously with the coil 81 exists below the input/output terminal backing 141a and the upper first magnetic film 111a exists, so that an electrical continuity can be securely established between the coil 81 and input/output terminal 151a.

Figure 7:
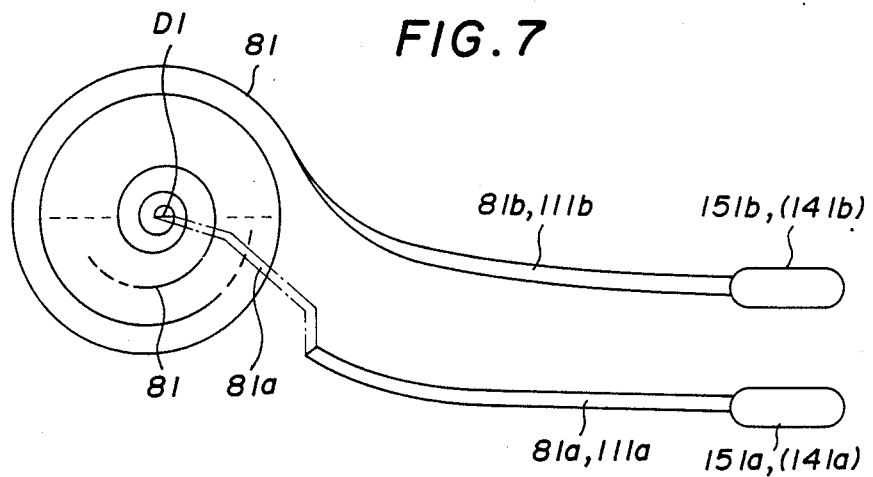
FIG. 7 is a schematic diagram showing the construction of the coil and wirings in the thin-film magnetic head fabricated by the method shown in FIGS. 6(a) thru (e).
Figure 8A:
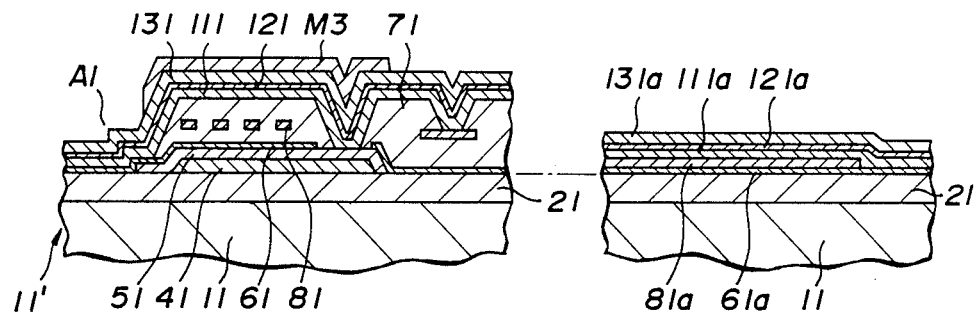
FIGS. 8 (a), (b), (c) and (d) are sectional views, respectively, showing a second method of fabricating the thin-film magnetic head shown in FIG. 4.
Figure 8B:
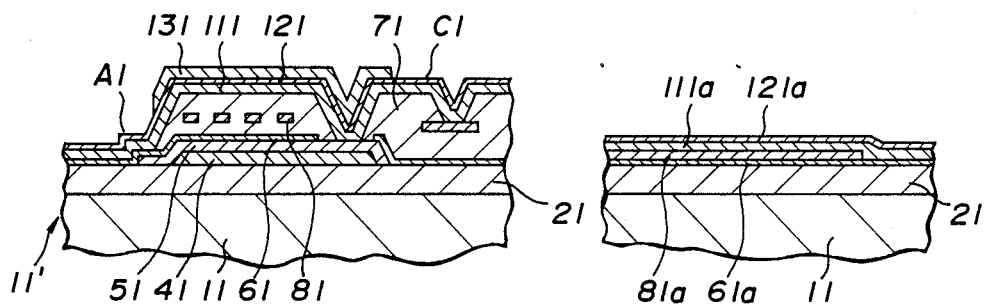
Figure 8C:
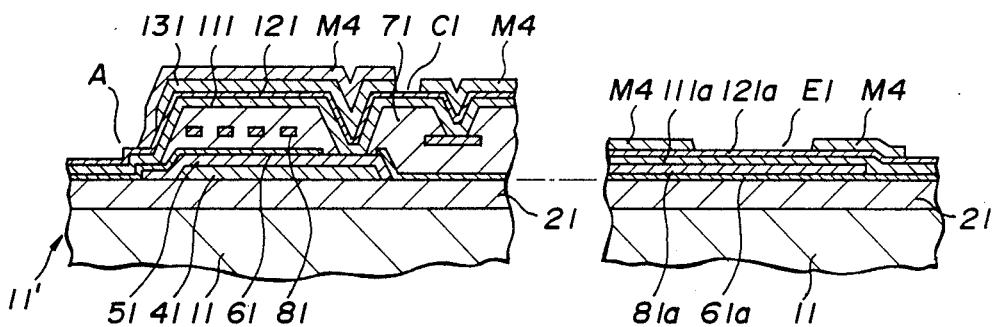
Figure 8D:
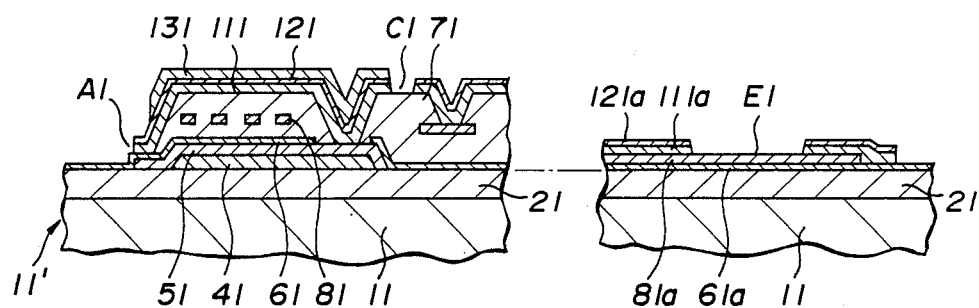
Figure 9A:
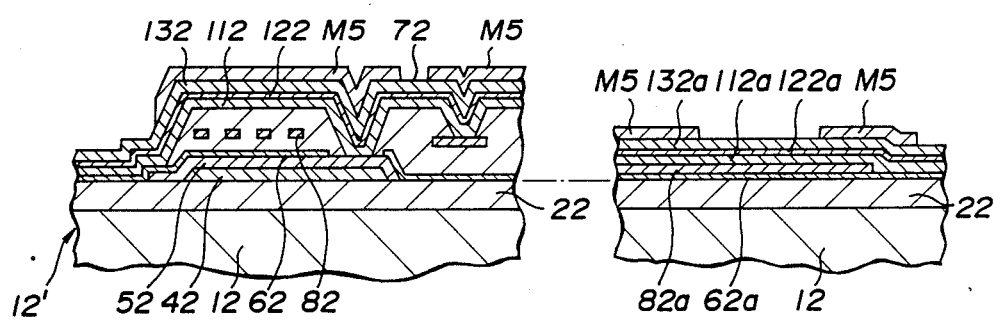
FIGS. 9 (a), (b), (c) and (d) are sectional views, respectively, showing the method of fabricating the thin-film magnetic head shown in FIG. 5.
Figure 9B:
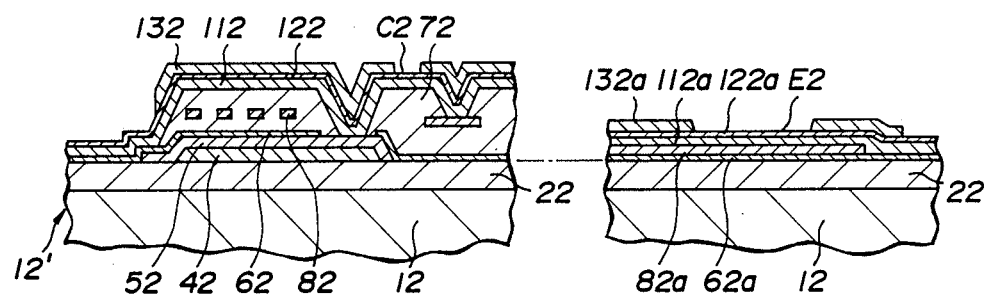
Figure 9C:
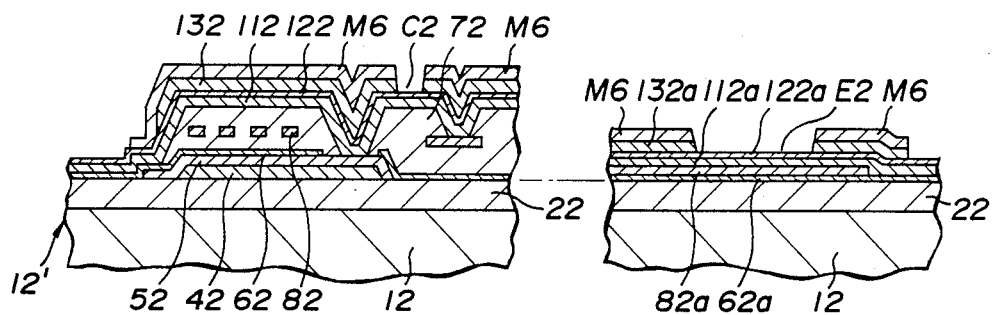
Figure 9D:
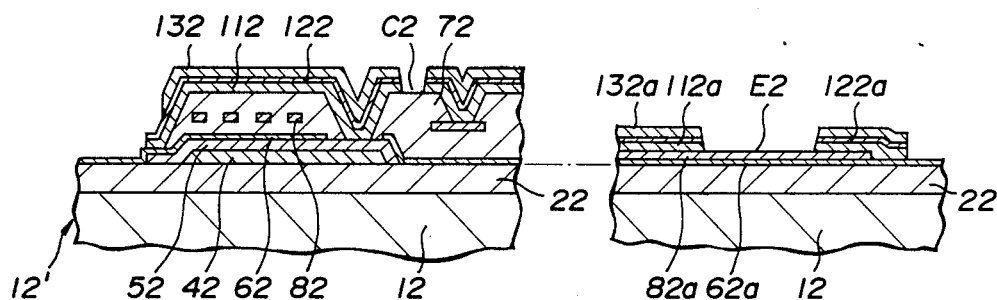

Also, the outer circumference of the coil 81 and the input/output terminal 151a are connected to each other as in the following. Namely, as shown in FIG. 7, the coil 81 and first wiring 81b are formed simultaneously from a same material. Further, the upper first magnetic film 111b, inorganic insulating film 121b and upper second magnetic film 131b are formed one after another on the first wiring 81b. The input/output terminal backing 141b and the first wiring 81b are connected to each other in a quite same manner as the connection of the first wiring 81a and input/output terminal backing 141a as shown in FIG. 4. That is, in the region where the input/output terminal backing 141a is formed, a quite same process as in the region E1 where the input/output terminal backing 141a is formed as shown in Figs. (a) thru (e) is effected.

Next, a second method of fabricating the thin-film magnetic head shown in FIG. 4 will be described with reference to FIGS. 8 (a) thru (d). It should be noted that in FIG. 8, it is assumed that the substrate 11, under-film 21, lower first and second magnetic films 41 and 51, magnetic gap film 61, coil 81 and insulating layer 71 have already been formed through well-known processes, respectively. They are generally called an intermediate 11' for the simplicity of explanation and illustration. On this intermediate 11' the upper first magnetic film 111 (111a), inorganic insulating, film 121 (121a) and upper second magnetic film 131 (131a) are formed in sequence.

First, a mask M3 is formed on the upper second magnetic film 131 as shown in FIG. 8 (a) and an etching is effected. The mask M3 is formed on a portion where the upper second magnetic film 131 forms the upper magnetic layer 101. The etching adopted here should preferably be a dry etching.

As a result of the etching, the upper second magnetic film 131 in the proximity of the region A1 facing the magnetic recording medium and the upper second magnetic film 131a to the right of the region C1 are removed as shown in FIG. 8 (b). And the remaining upper second magnetic film 131 forms a part of the upper magnetic core as shown in FIG. 4.

Next, a mask M 4 is formed as shown in FIG. 8 (c) and an etching is effected.

As the result of this etching, the inorganic insulating film 121a and upper first magnetic film 111 are partially removed in the region C1 and in the region E1 where the input/output terminal backing 141a is formed. Note that in the region E1 where the input/output terminal backing 141a is formed, etching is done down to the upper first magnetic film 111 but not until the upper first magnetic film 111 is completely removed. Therefore, as in FIGS. 8 (a) thru (d), the upper magnetic core portion takes a two-film structure consisting of the upper first and second magnetic films 111 and 131. The coil 81 is electrically connected to the upper first magnetic film 111 and first wiring 81a, and the region E1 in which the input/output terminal backing 141a is formed has the first wiring 81a exposed. Thus, the thin-film magnetic head shown in FIG. 4 is formed. The input/output terminal backing 141a, input/output terminal 151a, etc. are formed in the same manner as in the embodiment having been described with reference to FIGS. 6 (a) through (e).

In the region where the input/output terminal backing 141b is formed, quite a same process as in the region E1 in which the input/output terminal backing 141a is formed as shown in FIGS. 8 (a) thru (d). This is the same as in the method of thin-film magnetic head fabrication shown in FIGS. 6 (a) thru (e). Also, the input/output terminal backing 141b and input/output terminal 151b are formed in the same manner as the input/output terminal backing 141a and input/output terminal 151a.

Next, a method of fabricating the thin-film magnetic head according to the second embodiment of the present invention shown in FIG. 5 will be explained with reference to FIGS. 9 (a) thru (d). It should be noted that in FIG. 9, it is assumed that the substrate 12, under-film 22, lower first and second magnetic films 42 and 52, magnetic gap film 62, coil 82 and insulating layer 72 have already been formed through well-known processes, respectively. They are generally called an intermediate 12' for the simplicity of explanation and illustration. On this intermediate 12' the upper first magnetic film 112 (112a), inorganic insulating film 122 (122a) and upper second magnetic film 132 (132a) are formed in sequence.

First, a mask M5 is formed on the upper second magnetic film 132 as shown in FIG. 9 (a) and an etching is effected. The etching adopted here should preferably be a dry etching.

As the result of the etching, the upper second magnetic film 132 in the proximity of the region A2 facing the magnetic recording medium and the upper second magnetic film 132a to the right of the region C2 are removed as shown in FIG. 9 (b).

Next, a mask M6 is formed as shown in FIG. 9 (c) and an etching is effected.

As the result of this etching, the inorganic insulating films 122 and 122a and upper first magnetic films 112 and 112a are partially removed in the region near the region A2 facing the magnetic recording medium, region C1 and in the region E2 where the input/output terminal backing 142a is formed. Note that in the region E2 where the input/output terminal backing 142a is formed, etching is done down to the upper first magnetic film 112a but not until the upper first magnetic film 112a is completely removed. Thus, the thin-film magnetic head shown in FIG. 5 is formed. The input/output terminal backing 142a, input/output terminal 152a, etc. are formed in the same manner as in the embodiment having been described with reference to FIGS. 6 (a) through (e). Also, the region in which the input/output terminal backing is formed for the outer circumference of the coil 82 (not shown) is formed in quite a same manner as in the formation of the region E2 shown in FIGS. 9 (a) thru (e).

Figure 10:
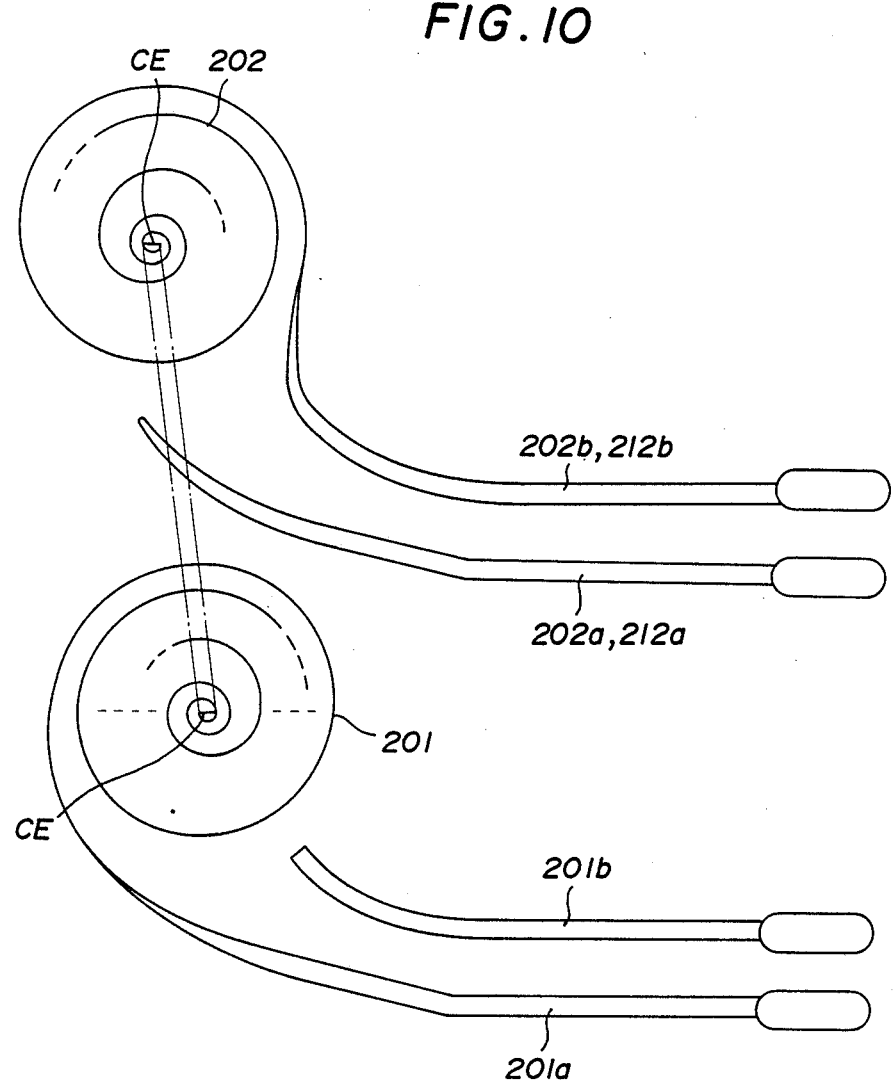
FIG. 10 is a schematic diagram showing the construction of the coil and wirings in case the present invention is applied to a thin-film magnetic head having a coil formed in two layers.

In the foregoing, the embodiments of a thin-film magnetic head having a coil formed in one layer have been described. However, the present invention is not limited to these embodiments but can be applied to a thin-film magnetic head having a coil formed in more than one layer. FIG. 10 is a schematic diagram showing the wiring of a thin-film magnetic head with a coil formed in more than one layer. As shown, the first coil 201 and second coil 202 are in contact with each other at the center CE thereof. The reference numerals 201a and 202b indicate first wirings made of a same material as and formed simultaneously with the first coil 201. Similarly, the reference numerals 202a and 202b indicate first wirings made of a same material as and formed simultaneously with the second coil. In fact, the first wirings 201 and 202a are formed as superposed one on the other. Also the first wirings 201b and 202b are similarly formed as superposed one on the other. Further, the first wiring 202a has formed thereon the upper first magnetic film 212a and similarly the first wiring 202b has formed thereon the upper first magnetic film 212b. The upper first magnetic films 212a and 212b are made of a same material as and simultaneously with the upper first magnetic film in the upper magnetic layer formed above the second coil 202. The above-mentioned upper magnetic layer is composed of the upper first magnetic film, inorganic insulating film and upper second magnetic film.

As seen from the foregoing description, according to the present invention, even in case the thin-film magnetic head has an upper magnetic core of a two-film structure with an inorganic magnetic film placed between the two films, the coil and input/output terminal can be electrically connected to each other. Also according to the present invention, it is possible to easily fabricate a thin-film magnetic head having an upper magnetic core of a two-film structure with an inorganic magnetic film between the two films without increasing the number of fabricating processes.

What is claimed is:

1. A thin-film magnetic head comprising:
   an electromagnetic conversion section; and
   a wiring section;
   said electromagnetic conversion section comprising
      a coil and
      an upper magnetic layer comprising,
         an upper first magnetic film,
         inorganic insulating layer, and
         upper second magnetic film,
      said upper first magnetic film being connected to a center of said coil at the electromagnetic conversion section;
   said wiring section comprising,
      a first wiring for a first input/output terminal, connected to an outer circumference of said coil and made of a same material as said coil; and a first wiring for a second input/output terminal, cut off at the center of said coil, and made of a same material as said coil, wherein said upper first magnetic film being a laminate on said first wiring for said first input/output terminal, thus constituting a second wiring for said first input/output terminal; and wherein said upper first magnetic film being a laminate on said first wiring for said second input/output terminal, thus constituting a second wiring for said second input/output terminal as well.

2. A thin-film magnetic head according to claim 1, wherein said upper first and second magnetic films both comprise a permalloy film.

3. A thin-film magnetic head according to claim 1, wherein said inorganic insulating layer comprises alumina.

4. A thin-film magnetic head according to claim 1, further comprising an inorganic insulating layer on each of said first wiring for said first input/output terminal and said first wiring for said second input/output terminal.

5. A thin-film magnetic head according to claim 1, further comprising an inorganic insulating layer and an upper second magnetic film on each of said first wiring for said first input/output terminal and said first wiring for said second input/output terminal.

6. A thin-film magnetic head comprising:
an electromagnetic conversion section; and
a wiring section;
said electromagnetic conversion section comprising,
    a coil; and
    an upper magnetic layer comprising
        an upper first magnetic film,
        inorganic insulating layer, and
        an upper second magnetic film,
        wherein said upper first magnetic film is connected to a center of said coil;
said wiring section comprising,
    a first wiring for a first in put/output terminal, connected to an outer circumference of said coil, and made of a same material as said coil; and
    a first wiring for a second input/output terminal, cut off at the center of said coil, and made of a same material as said coil;
said upper first magnetic film being a laminate on said first wiring for said first input/output terminal at the wiring section, thus constituting a second wiring for said first input/output terminal;
said second wiring for said first input/output terminal having a portion thereof removed where an input/output terminal backing is formed;
an input/output terminal backing for said first input/output terminal disposed on said first wiring at the wiring section;
said upper first magnetic film being a laminate on said first wiring for said second input/output terminal at the wiring section, thus constituting a second wiring for said second input/output terminal;
said second wiring for said second input/output terminal having a portion thereof removed where a second input/output terminal backing is formed; and
an input/output terminal backing for said second input/output terminal disposed on said first wiring at the wiring section.

7. A thin-film magnetic head according to claim 6, further comprising first and second input/output terminals being provided on said first and second input/output terminal backings, respectively.

8. A thin-film magnetic head according to claim 7, wherein said input/output terminals comprise gold.

9. A thin-film magnetic head according to claim 6, wherein said upper first and second magnetic films both comprise a permalloy film.

10. A thin-film magnetic head according to claim 6, wherein said inorganic insulating layer comprises alumina.

11. A thin-film magnetic head according to claim 6, wherein said input/output terminal backings comprise copper.

12. A thin-film magnetic head according to claim 6, further comprising an inorganic insulating layer disposed on both of said first wiring for said first input/output terminal and said first wiring for said second input/output terminal.

13. A thin-film magnetic head according to claim 6, further comprising an inorganic insulating layer and an upper second magnetic film disposed on both of said first wiring for said first input/output terminal and said first wiring for said second input/output terminal.

14. A thin-film magnetic head comprising:
an electromagnetic conversion section, and
a wiring section,
said electromagnetic conversion section comprising,
    an upper magnetic layer comprising,
        an upper first magnetic film,
        inorganic insulating layer, and
        upper second magnetic film, and
    first and second coils connected to each other at the centers thereof;
said wiring section comprising,
    a first wiring for a first input/output terminal, connected to an outer circumference of said first coil, and made of a same material as said first coil; and
    a first wiring for a second input/output terminal connected to an outer circumference of said second coil, and made of a same material as said second coil;
said upper first magnetic film being a laminate on said first wiring for said first input/output terminal at the wiring section, thus constituting a second wiring for said first input/output terminal;
said upper first magnetic film being a laminate on said first wiring for said second input/output terminal at the wiring section, thus forming a second wiring for said second input/output terminal as well.

15. A thin-film magnetic head according to claim 14, wherein said upper first and second magnetic films both comprises a permalloy film.

16. A thin-film magnetic head according to claim 14, wherein said inorganic insulating layer comprises alumina.

17. A thin-film magnetic head according to claim 4, further comprising an inorganic insulating layer disposed on each of said first wiring for said first input/output terminal and said first wiring for said second input/output terminal.

18. A thin-film magnetic head according to claim 14, further comprising, an inorganic insulating film and an upper second magnetic film both disposed on each of said first wiring for said first input/output terminal and said first wiring for said second input/output terminal.

19. A thin-film magnetic head comprising:
an electromagnetic conversion section; and a wiring section
said electromagnetic conversion section, comprising,
    an upper magnetic layer comprising,
        an upper first magnetic film,
        inorganic insulating layer, and
        upper second magnetic film, and
    first and second coils connected to each other at the centers thereof;
said wiring section comprising,
    a first wiring for a first input/output terminal, connected to a outer circumference of said first coil, and made of a same material as said first coil; and
    a first wiring for a second input/output terminal, connected to an outer circumference said second coil, and made of a same material as said second coil;
said upper first magnetic film being a laminate on said first wiring for said first input/output terminal at the wiring section, thus constituting a second wiring for said first input/output terminal;
an input/output terminal backing for said first input/output terminal disposed on said first wiring at a portion thereof wherein a portion of said second wiring has been removed;
said upper first magnetic film being a laminate on said first wiring for said second input/output terminal at the wiring section, thus constituting a second wiring for said second input/output terminal; and
a second input/output terminal backing for said second input/output terminal disposed on said first wiring for the second input/output terminal at the wiring section at a portion thereof wherein said second wiring has been removed.

20. A thin-film magnetic head according to claim 19, wherein said upper first and second magnetic films both comprise a permalloy film.

21. A thin-film magnetic head according to claim 19 further comprising input/output terminals being provided on said first and second input/output terminal backings, respectively.

22. A thin-film magnetic head according to claim 19, wherein said input/output terminal comprises alumina.

23. A thin-film angelic head according to claim 19, wherein said inorganic insulating layer comprises alumina.

24. A thin-film magnetic head according to claim 19, wherein said input/output terminal backing comprises copper.

25. A thin-film magnetic head according to claim 19, further comprising an inorganic insulating layer disposed on each of said first wiring for said first input/output terminal and said first wiring for said second input/output terminal.

26. A thin-film magnetic head according to claim 19, further comprising an inorganic insulating layer and an upper second magnetic film both disposed on each of said first wiring for said first input/output terminal and said first wiring for said second input/output terminal.

* * * * *

UNITED STATES PATENT AND TRADEMARK OFFICE
CERTIFICATE OF CORRECTION

PATENT NO. : 4,949,209
DATED : 14 August 1990
INVENTOR(S) : Tadashi IMANAKA et al.

It is certified that error appears in the above-identified patent and that said Letters Patent is hereby corrected as shown below:

| Column | Line | Corrections |
|---|---|---|
| ABS. | 2 | After "layer)" delete the comma. |
| ABS. | 3 | After "which" change "are" to --is-- |
| 1 | 12 | Before "upper" delete "an". |
| 1 | 18 | Before "upper" delete "an". |
| 1 | 21 | After "thin" insert --,--. |
| 1 | 24 | After "thick" insert --,--. |
| 2 | 58 | Delete "magnetic". |
| 3 | 3 | Change "as" to --a--; after "laminated" delete "an". |
| 3 | 67 | After "due" delete --,--. |
| 4 | 6 | After "and" insert --the--. |
| 4 | 62 | After "a" delete "the". |
| 5 | 34 | After "disposed" change "on" to --an--. |
| 5 | 53 | Change "laminated" to --laminate--. |
| 6 | 59 | Change "112 a" to --112a--. |
| 8 | 39 | Delete "a"; after "quite" insert --the--. |

UNITED STATES PATENT AND TRADEMARK OFFICE
CERTIFICATE OF CORRECTION

PATENT NO. : 4,949,209            Page 2 of 2
DATED : 14 August 1990
INVENTOR(S) : Tadashi IMANAKA et al.

It is certified that error appears in the above-identified patent and that said Letters Patent is hereby corrected as shown below:

| | | |
|---|---|---|
| 8 | 42 | Delete "a quite"; insert --the--. |
| 8 | 56 | After "insulating" delete ",". |
| 9 | 27 | Delete "quite a" and insert --the--. |
| 9 | 29 | After "d" insert --, is utilized-- |
| 10 | 10 | Delete "quite a" and insert --the--. |
| 10 | 39 | After "film", first occurrence, change "." to --,--. |
| 11 | 40 | Change "in put" to --input--. |
| 12 | 53 | Change "comprises" to --comprise--. |
| 13 | 11 | Change "a" to --an--. |
| 13 | 14 | After "circumference" insert --of--. |
| 14 | 2 | After "wherein" insert --some of--. |

Signed and Sealed this

Fourteenth Day of January, 1992

Attest:

HARRY F. MANBECK, JR.

*Attesting Officer*      *Commissioner of Patents and Trademarks*